United States Patent [19]

Lilley et al.

[11] Patent Number: 4,703,624

[45] Date of Patent: Nov. 3, 1987

[54] MASTER CYLINDER FOR VEHICLE BRAKING SYSTEM

[75] Inventors: Eric M. Lilley; David J. Parker, both of Solihull, England

[73] Assignee: Lucas Industries, Birmingham, England

[21] Appl. No.: 858,870

[22] Filed: May 1, 1986

Related U.S. Application Data

[63] Continuation of Ser. No. 575,562, Jan. 31, 1984, abandoned.

[30] Foreign Application Priority Data

Feb. 15, 1983 [GB] United Kingdom ............... 8304108

[51] Int. Cl.$^4$ ............................................. B60T 11/08
[52] U.S. Cl. ........................................ 60/578; 60/588
[58] Field of Search ..................... 60/578, 585, 592

[56] References Cited

U.S. PATENT DOCUMENTS

| | | | |
|---|---|---|---|
| 2,093,543 | 9/1937 | Bowen | 60/578 |
| 2,197,681 | 4/1940 | Bowen | 60/578 |
| 2,230,419 | 2/1941 | White | 60/578 |
| 2,374,235 | 4/1945 | Roy | 60/578 |
| 2,518,821 | 8/1950 | Roy | 60/578 |
| 3,166,907 | 1/1965 | Randol | 60/578 |
| 3,186,174 | 6/1965 | Hayman | 60/578 |
| 4,347,779 | 9/1982 | Belart | 60/588 |
| 4,364,231 | 12/1982 | Dwyer | 60/578 |
| 4,398,390 | 8/1983 | Gaiser | 60/578 |
| 4,467,605 | 8/1984 | Smith | 60/578 |

FOREIGN PATENT DOCUMENTS

| | | | |
|---|---|---|---|
| 424676 | 2/1935 | United Kingdom | 60/578 |
| 2060103 | 4/1981 | United Kingdom | 60/578 |
| 2082277 | 3/1982 | United Kingdom | 60/588 |
| 2102517 | 2/1983 | United Kingdom | 60/578 |

*Primary Examiner*—Abraham Hershkovitz
*Attorney, Agent, or Firm*—Holman & Stern

[57] ABSTRACT

A master cylinder of the quick-fill type has a pressure cylinder, a reservoir mounted thereon and a quick-fill chamber. The reservoir forms a compartment housing valve means controlling communication between the quick-fill chamber and reservoir.

12 Claims, 1 Drawing Figure

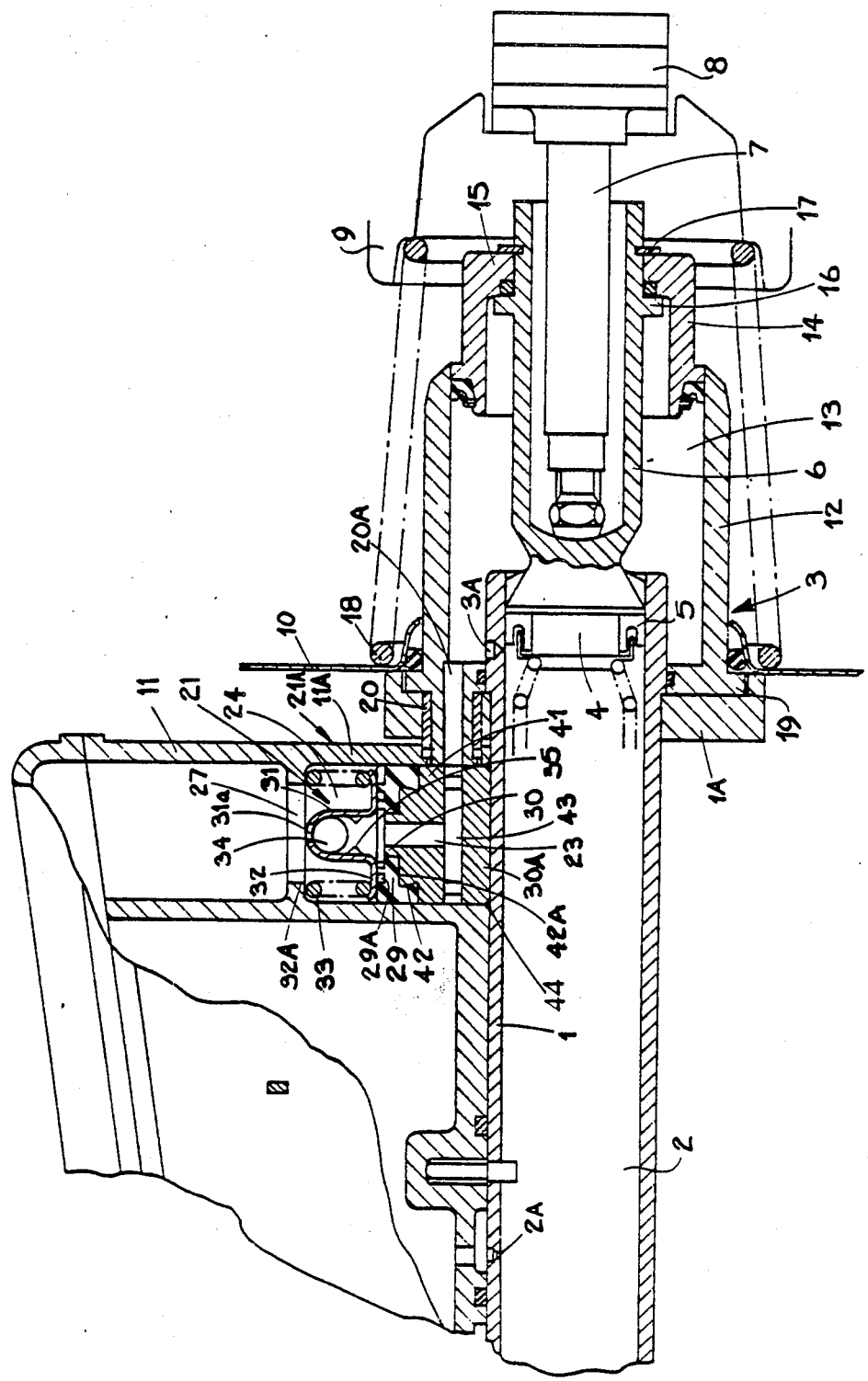

MASTER CYLINDER FOR VEHICLE BRAKING SYSTEM

This is a continuation of application Ser. No. 575,562, filed Jan. 31, 1984 and now abandoned.

This application relates to copending application Ser. No. 879,496, filed June 24, 1986 in the names of the same inventors and assigned to the same assignee.

BACKGROUND OF THE INVENTION

1. Field of the Invention

This invention relates to a master cylinder of the "quick-fill" type, primarily for use in a vehicle braking system. Such a master cylinder is one which, when actuated, initially expells a large quantity of fluid into the braking system to cause rapid take-up of brake clearances and thereby minimize the amount of brake pedal travel required for this purpose. Examples of quick-fill master cylinders are described in our published copending British Pat. application No. 2074675.

2. Description of the Prior Art

There is an increasing trend in modern vehicle braking systems to use fabricated master cylinders in which the pressure cylinder is a simple steel tube of relatively thin uniform wall thickness, with a separate reservoir, usually of plastics material, mounted on the cylinder and communicating with the interior of the latter through transverse ports formed in the cylinder wall. The provision of a quick-fill facility in a master cylinder of this kind gives rise to considerable problems because a large chamber has to be provided for the low pressure quick-fill fluid, and, valve means is also required to control communication between this chamber and the reservoir. Because of the nature of the pressure cylinder there is insufficient material available to enable previous proposals for incorporating the valve means in the structure of the cylinder to be practicable.

BRIEF SUMMARY OF THE INVENTION

It is, therefore, an object of the present invention to provide means for incorporating control valve means for a quick-fill facility primarily, but not exclusively, in a fabricated master cylinder.

According to the invention, a master cylinder of the quick-fill type comprises a pressure cylinder, a separate reservoir mounted on and communicating with the pressure cylinder, a quick-fill chamber, pistons slidable respectively in the pressure cylinder and quick-fill chamber, and valve means arranged and operable to control communication between the quick-fill chamber and the reservoir, the valve means being contained in a compartment formed at least partially by the reservoir body.

In one convenient arrangement, the components of the valve means are retained permanently within said compartment so that the reservoir and valve means together form a complete sub-assembly.

The valve means may conveniently communicate with the quick fill chamber via a passageway which extends axially of the cylinder and is preferably defined, at least partially, by a closure member of the cylinder.

BRIEF DESCRIPTION OF THE DRAWING

The invention will now be described, by way of example, with reference to the single accompanying drawing which is a longitudinal cross-sectional view of part of one form of the master cylinder of the invention.

DETAILED DESCRIPTION

The drawing illustrates part of a tandem master cylinder for use in a dual circuit braking system and comprising a pressure cylinder 1, shown as a thin-walled tube of uniform wall thickness having an axial blind bore 2, the open end of which is closed by a closure member indicated generally at 3. The internal components of the pressure cylinder are conventional and have not been shown in detail. However, the rearmost one 4 of a pair of pistons within the bore 2 is illustrated, the piston 4 being provided with a seal 5 and having a rearwardly extending sleeve 6 through which extends an actuating rod 7 connected, in conventional manner, to an actuating member 8 of a booster, of which a power piston hub is indicated at 9 and a body shell portion at 10. A reservoir 11 is mounted at the upper side of the cylinder 1 and communicates respectively with the internal chambers of the cylinder through ports 2A and 3A formed transversely through the cylinder wall.

The closure member 3 includes a sleeve 12 of relatively large diameter compared with the pressure cylinder 1 and partially defining a quick-fill chamber 13 having a relatively large volume. The open end of the sleeve 12 is closed by a cup like piston 14 slidable within the sleeve 12, the base 15 of the piston 14 being apertured to receive the rear end portion of the sleeve 6 therethrough. The base 15 is held captive between a radial shoulder 16 of the sleeve 6 and a circlip 17 lodged in a groove in the sleeve 6. Thus, it will be seen that the pistons 4 and 14 move together as a unit in response to actuating force transmitted via the rod 7.

The closure member 3 is retained in position against a fixing flange 1A of the pressure cylinder 1 by means of the booster body shell 10 which is itself clamped against the flange by a spring 18 forming part of the booster mechanism and traps a shoulder 19 of the sleeve 12 between itself and the flange 1A. The sleeve 12 has an axial tubular extension 20 having a bore therein 20A which provides communication between the quick-fill chamber 13 and control valve means 21 for controlling operation of the quick-fill chamber.

A compartment 21A formed by the reservoir body houses the valve means 21, the reservoir having, for this purpose, an additional wall portion 11A which extends downwardly into engagement with the pressure cylinder 1 and is apertured to receive the axially extending portion 20 of the closure element sleeve 12.

The valve means includes a valve mechanism which comprises a resilient annular seal 29 snugly fitted within an annular space formed between a central spigot 30 of a valve support member 30A and the inner wall of the valve chamber, a generally tubular valve member 31 having an outwardly projecting flange 32 which rests upon the valve member 29, and a spring 33 acting between the flange 32 and an internal shoulder 32A of the reservoir to urge the valve member 31 into sealing engagement with the valve member 29. The upper end of the valve member 31, as seen in the drawing, has a port 31A therethrough around which is formed a valve seat for co-operation with a ball 34 which acts as a one-way valve, the ball being held captive within the valve member 31 by means of inwardly projecting tags 35 on the latter.

The support member 30A has a central boss 41 having an undercut edge 42 and the valve member 29 is provided on its undersurface with a recess 42A of appropriate shape to receive the boss 41, the valve member being snap-engaged over the boss so as to be retained thereon by the undercut edge 42 and thereby form a sub-assembly with support member 30A. The support member provides an extension 43 of the axially extending passage 20A of the closure member 12, communicating with the valve chamber 24 via a perpendicular branch 23.

The provision of the compartment defined by the reservoir enables the valve means to be assembled into the compartment from below the reservoir, the base member being finally placed in the position illustrated and permanently secured to the reservoir by a weld 44. The valve means and reservoir then form together a complete sub-assembly which may conveniently be stored until required for use. It may readily be connected to the quick-fill chamber 13 by means of the sleeve extension 20 which enters a corresponding opening in the wall 11A.

During actuation of the master cylinder, the pistons 4 and 14 move forward in unison from the positions illustrated and fluid is expelled by the piston 14 from the large volume quick-fill chamber 13. The strength of the spring 33 is chosen so that the pressure generated initially by the piston 14 is not large enough to lift the valve member 29 against the action of the spring 33. Since, however, the pressure causes the ball 34 to close the port 31A in the valve member 31, fluid from the quick-fill chamber is urged past the seal 5 of the piston 4 into the pressure chamber 2 and thence to the braking system so as rapidly to take up brake clearances in known manner. When pressure has built up in the chamber 2 to an extent preventing further flow of fluid into this chamber from the quick-fill chamber 30, the valve member 31 is lifted out of sealing engagement with the resilient valve member 29, thereby permitting fluid from the quick-fill chamber 13 to be expelled along the axial passage 20A past the valve member 31 and through a port 27 into the reservoir. The resilient valve member 29 is provided at its upper surface with a groove 29A, preferably of spiral configuration, to facilitate flow of fluid between the valve members 29 and 31. When the pistons 4 and 15 return towards their rest positions after braking, the ball 34 moves downwardly away from the port in the valve member 31 to the extent limited by the tags 35 and fluid is thereby permitted to be drawn from the reservoir into the quick-fill chamber.

It will be seen that the invention provides a convenient means of providing a control valve means in a fabricated master cylinder which has little substantial structure suitable for incorporating such components.

We claim:

1. A master cylinder of the quick-fill type comprising:
a pressure cylinder in the form of a separate tubular member having a uniform wall thickness and a uniform outer cylindrical surface along substantially its entire length;
a piston operatively slidably mounted within said pressure cylinder;
a quick-fill chamber defined by a closure sleeve mounted at one end of said tubular member to close said one end of said tubular member;
a piston operatively slidably mounted within said quick-fill chamber;
a separate fluid reservoir member mounted on said outer cylindrical surface of said tubular member;
a valve compartment formed in said reservoir member and disposed entirely externally of said uniform outer cylindrical surface of said tubular member and communicating with said reservoir;
valve means operatively mounted in said valve compartment and disposed entirely externally of said uniform outer cylindrical surface of said tubular member and communicating with said reservoir;
a recuperation port through the wall of said tubular member at a position axially remote from said valve compartment and valve means and communicating said quick-fill chamber with the interior of said tubular member;
an axial extension on said closure sleeve; and
fluid flow passageway means extending axially with respect to and externally of said tubular member and communicating said valve means with said quick-fill chamber and said recuperation port, said fluid flow passageway means being partly in said valve means and partly in said axial extension on said closure sleeve, so that said valve means controls the flow of fluid between said chamber and said reservoir.

2. A master cylinder as claimed in claim 1 wherein:
said valve means comprises a plurality of valve components; and further comprising,
means to permanently retain said valve components within said valve compartment,
so that said reservoir and valve means together form a complete sub-assembly.

3. A master cylinder as claimed in claim 2 wherein:
said means to retain said valve components comprises a closure element in said valve compartment which supports a valve component in said valve compartment.

4. A master cylinder as claimed in claim 3 wherein:
said closure element and said valve component are provided with interengageable formations to facilitate connecting said closure element and valve component together.

5. A master cylinder as claimed in claim 3 wherein:
said part of said passageway means in said valve means is in said closure element.

6. A master cylinder as claimed in claim 4 wherein:
said part of said passageway means in said valve means is in said closure element.

7. A master cylinder of the quick-fill type comprising:
a pressure cylinder in the form of a tubular member having a uniform wall thickness and a uniform outer cylindrical surface along substantially its entire length;
a piston operatively slidably mounted within said pressure cylinder;
a quick-fill chamber defined by a closure sleeve mounted at one end of said tubular member to close said one end of said tubular member;
a piston operatively slidably mounted within said quick-fill chamber;
a separate fluid reservoir member mounted on said outer cylindrical surface of said tubular member;
a valve compartment formed in said reservoir member and defined by walls and disposed entirely externally of said uniform outer cylindrical surface of said tubular member and communicating with said reservoir;
a closure element in said valve compartment;
valve means operatively mounted in said valve compartment and disposed entirely externally of said uniform outer cylindrical surface of said tubular member and communicating with said reservoir;

a recuperation port through the wall of said tubular member at a position axially remote from said valve compartment and valve means and communicating said quick-fill chamber with the interior of said tubular member;

an opening through a wall of said valve compartment;

an axial extension on said closure sleeve having an outer end inserted within said opening; and fluid flow passageway means communicating said valve means with said quick-fill chamber and said recuperation port extending axially with respect to and externally of said tubular member, said fluid flow passageway means being partly in said valve means and partly within said axial extension, said part in said valve means being in said closure element and said part in said axial extension communicating through said outer end of said axial extension with said part in said closure element, so that said valve means controls the flow of fluid between said chamber and said reservoir.

8. A master cylinder as claimed in claim 7 wherein: said valve means comprises a plurality of valve components; and further comprising, means to permanently retain said valve components within said valve compartment;

so that said reservoir and valve means together form a complete sub-assembly.

9. A master cylinder as claimed in claim 8 wherein: said means to retain said valve components comprises a closure element in said valve compartment which supports a valve component in said valve compartment.

10. A master cylinder as claimed in claim 9 wherein: said closure element and said valve component are provided with interengageable formations to facilitate connecting said closure element and valve component together.

11. A master cylinder as claimed in claim 9 wherein: said part of said passageway means in said valve means is in said closure element.

12. A master cylinder as claimed in claim 10 wherein: said part of said passageway means in said valve means is in said closure element.

* * * * *